P. Lincoln,
Mower.

N° 37,969.  Patented Mar. 24, 1863.

Witnessed by,
Phineas O. Nichols.
Charles P. Lincoln

Peries Lincoln

UNITED STATES PATENT OFFICE.

PERIES LINCOLN, OF COLDWATER, MICHIGAN.

IMPROVEMENT IN WHEELS FOR HARVESTERS.

Specification forming part of Letters Patent No. 37,969, dated March 24, 1863.

*To all whom it may concern:*

Be it known that I, PERIES LINCOLN, of the township of Coldwater, in the county of Branch, and in the State of Michigan, have invented a new, useful, and improved wheel with stationary or non-revolving arms and revolving rim, to be used as an inside wheel to harvesters and mowers, allowing their finger-bars to pass through the rim between the arms, said arms to be used as a foundation for moving said finger-bars. Said wheel I denominate the "Union Wheel;" and I do hereby declare that the following is a full, clear, and exact description of the construction and operation of the same, reference being had to the annexed drawings, which is made a part of this specification, in which—

Figure 1:
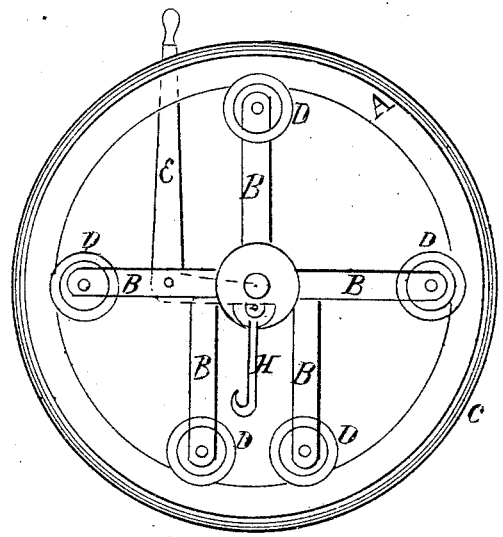
Figure 2:
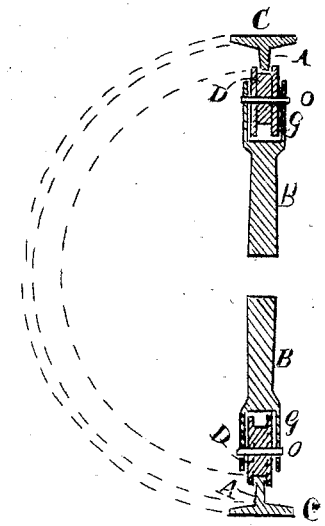

Figure 1 is a side view of wheel and fixtures. Fig. 2 is a transverse section, showing arms, rollers, rim, and flange.

Fig. 1: Letter C is a rim; A, flange; B B B B B, arms; D D D D D, rollers; E, lever; O O O O O O, pins; H, hook.

Fig. 2: Letters B B are arms; C C, rim; A A, flange; D D, rollers; O O, pins; G G, slots.

I make the arms B B B B B in any of the known forms, fastened at the center by hub or otherwise, with slot in end, as shown in Fig. 2, letters G G.

I make the rollers with a double flange or groove, said rollers being secured in the slots by pin or axle to revolve upon.

I make the rim C with flange A, as shown in Fig. 1, to fit the double flanged or grooved rollers D D D D D.

What I claim as my invention, and desire to secure by Letters Patent, is—

The peculiar arrangement and combination of rollers D D D D D with the stationary arms B B B B B, and revolving rim with flange C and A, as set forth.

PERIES LINCOLN.

Witnesses:
PHINEAS P. NICHOLS,
CHARLES P. LINCOLN.